Nov. 10, 1964 A. D. MARTIN ETAL 3,156,896

PLURAL PATH MAGNETOSTRICTIVE PULSE DELAY LINE HAVING SEPARATION AND RECOMBINATION OF THE PULSE TRAIN

Filed Oct. 20, 1958

2 Sheets-Sheet 1

INVENTOR
ALFRED DARGIE MARTIN
OLIVER CRAIG WELLS
BY P. M. Craig, Jr.
ATTORNEY

INVENTOR
ALFRED DARGIE MARTIN
OLIVER CRAIG WELLS
BY [signature]
ATTORNEY

United States Patent Office 3,156,896
Patented Nov. 10, 1964

3,156,896

PLURAL PATH MAGNETOSTRICTIVE PULSE DELAY LINE HAVING SEPARATION AND RECOMBINATION OF THE PULSE TRAIN

Alfred D. Martin, Beeston, Nottingham, and Oliver C. Wells, London, England, assignors to Ericsson Telephones Limited, London, England, a British company Filed Oct. 20, 1958, Ser. No. 768,290
Claims priority, application Great Britain Oct. 21, 1957
16 Claims. (Cl. 340—167)

The present invention relates to electro-mechanical delay devices for delaying electrical signals, and particularly but not exclusively to magnetostrictive delay devices.

Such devices are known in which, for example, an input transducer is used to set up stress or pressure waves in a delay element in response to electrical pulses, the delay element taking the form of a rod, wire, strip or tube of magnetostrictive material, and in which an output transducer is used to respond to such pressure or stress waves when they have travelled some distance through the delay element. By adjusting the length of the delay element between the two transducers the time delay may be set to a predetermined value. The transducers in such devices usually take the form of coils which are inductively coupled to the delay element.

The manner in which such a device operates is somewhat as follows: The change in magnetic induction caused by a signal in the input transducer changes the dimensions of the delay element in the region of the transducer because of the magnetostrictive properties of the delay element, and an acoustic pressure wave is launched in the element and travels therein. The pressure wave changes the dimensions of the delay element in the region of the output transducer and hence induces an output signal in this transducer by the inverse magnetostrictive effect.

Such delay devices are well known and may be made to operate satisfactorily with input pulses each having a duration in the region of one microsecond or longer. In some applications it is desirable that such devices should operate with input pulses each having a duration less than one microsecond, say one half microsecond and a pulse repetition frequency in the region of one megacycle per second. When this is attempted with such known delay devices difficulties are encountered.

For example as the wave passes through the output transducer there is a change in the permeability of the magnetostrictive material within the coil resulting in an induced voltage in this coil. As the wave enters there is a voltage excursion in one direction, say negative, as it leaves, an excursion in the other direction. Similarly the trailing edge of the wave induces a stress curve which results in voltage excursions in the output coil, a positive pulse on entering, a negative pulse on leaving.

When the pulse applied to the input transducer is of a predetermined duration related to the length of the input and output transducers and to the nature and dimensions of the delay element the two upward excursions of the voltage waveform at the output transducer add giving a resultant waveform having a small downward excursion followed by a larger upward excursion and a further small downward excursion. This phenomenon is familiar to those acquainted with acoustic delay lines, the duration of the ideal output waveform being approximately three times the duration of the pulse applied to the input transducer.

The duration of the output waveform is dependent upon the length of the stress wave producing it. Dispersion occurs within the delay element due to various causes and the longer the delay the greater this dispersion. If the input pulses follow each other sufficiently rapidly it is found impossible to resolve the output waveforms sufficiently to obtain reliable operation of the device.

It has been suggested that the aforesaid difficulties might be overcome by operating two half length delay elements in series, the first such element being followed by pulse reshaping circuits and an amplifier to drive the second such element. It has been found, however, that the amount of dispersion in some otherwise excellent delay element materials follows a law relating dispersion to distance travelled which is roughly exponential so that in a half length element dispersion is little less than that for a full length element and amplification and reshaping of the pulses is very nearly as difficult at the end of the half length element as it would be at the end of a full length element.

An object of the present invention is to provide an improved electro-mechanical delay device in which the aforementioned difficulties are reduced.

A further object of the invention is to provide an improved electro-mechanical delay device capable of operation at higher pulse repetition frequencies than hitherto.

Yet another object of the invention is to provide an improved electro-mechanical delay device which is capable of providing longer delays than hitherto.

According to the present invention, an electro-mechanical delay device comprises a plurality of delay elements each having an input transducer and an output transducer, switch means adapted to connect the input transducers separately in a recurring sequence to a common input circuit, and a combining circuit connected between the output transducers and a common output circuit, the combining circuit being adapted to combine selected regions of signals appearing in the output transducers.

Thus a signal to be delayed is divided into a number of parts spaced in time. Different parts are delayed individually and selected regions of the delayed parts are combined and fed to the common output circuit. Thus it can be arranged that should a negative-going region of one delayed part reproduced by an output transducer coincide with a positive-going region of a part reproduced by another of the output transducers only the positive-going region is reproduced or vice versa.

In a preferred embodiment of the invention the said delay elements each take the form of a wire having magnetostrictive properties and the input and output transducers take the form of coils inductively coupled to the wires.

The said switch means may comprise a plurality of gates connected between the input circuit and the input transducers respectively. The gates are adapted to be opened and closed in a recurring sequence by pulses applied thereto.

Where the input signals to be delayed are in pulse form the gating pulses are preferably synchronised with the applied pulses.

Any convenient means may be employed as the combining means for feeding to the common output circuit selected regions of the signals appearing in the output transducers. For example biased diodes, or rectifiers, may be connected to the output transducers for passing signals above the bias level to the output circuit. Alternatively biased translating devices such as transistors or electron discharge valves may be used. In one embodiment the combining means comprise a plurality of electron discharge valves having their cathodes connected to one another and to a negative source of current by way of a common load resistor and their anodes connected to a positive source of current, the control grids of the valves being driven by positive-going output signals derived from the said delay elements by way of the said output transducers respectively and amplifiers, the said grids being biased to determine the level to be exceeded before output signals are produced.

In another embodiment of the invention signals appearing in the output transducers are applied through separate gates to the common output circuit. The gates are AND gates each requiring two input voltages to provide an output voltage. One input voltage is that provided by the output transducer associated with the gate and the other by a recurring pulse. The recurring pulses applied to the different gates are of different instants of occurrence so chosen as to select predetermined regions of the voltages from the output transducers.

The invention will now be described by way of example with reference to the accompanying drawings in which.

Figure 1:
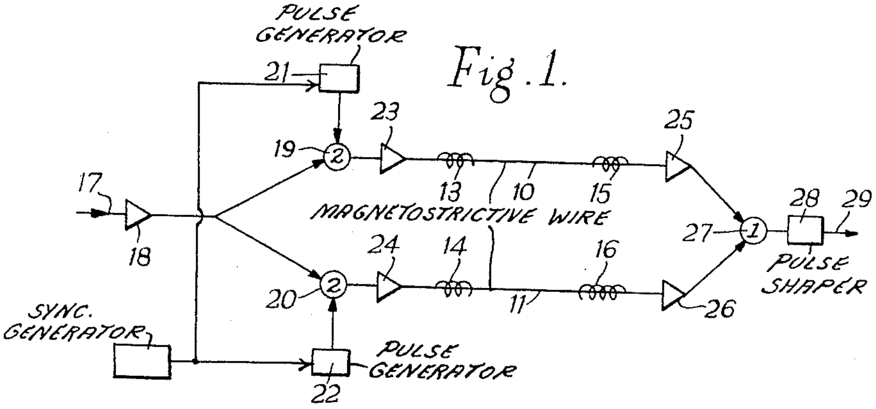
FIG. 1 shows in logical diagram form a delay device.

In FIG. 1 a delay device is shown which comprises two delay elements 10 and 11 of wire having magnetostrictive properties, the wires being provided with input coils 13, 14 and output coils 15 and 16 respectively. An input circuit 17 is provided with an amplifier 18 the output from which is connected to two AND gates 19 and 20. The AND gate 19 is supplied with gating pulses from a generator 21 and the AND gate 20 is supplied with gating pulses from a generator 22. The input signals appearing in the input circuit 17 are of pulse form and it is arranged that the pulses produced by the generators 21 and 22 are in synchronism with the input pulses in the input circuit 17, but occur at half the repetition frequency of the input pulses and that the pulses generated by the two generators are interlaced with one another whereby the gates 19 and 20 are opened alternately.

The gate 19 is connected to an amplifier 23 and thence to the input coil 13 of the delay element 10. Similarly the gate 20 is connected to the input coil 14 of the delay element 11 by way of an amplifier 24. The output coils 15 and 16 are connected through amplifiers 25 and 26 respectively to a combining circuit 27 and thence through a pulse lengthening and shaping circuit 28 to a common output circuit 29. The combining circuit 27 is adapted to pass to the circuit 28 all positive-going signals exceeding a predetermined datum level and to block all signals below the said predetermined level. An example of a suitable combining circuit will be described later with reference to FIG. 2.

In operation the input pulses appearing in the input circuit 17 are amplified in the amplifier 18 and are then passed to the AND gates 19 and 20 simultaneously. The gates 19 and 20 are switched alternately by the pulses generated by the generators 21 and 22 which are synchronised with the input pulses in such a manner that in each input pulse period a gating pulse is passed either to the gate 19 or to the gate 20. The AND gates 19 and 20 each produce an output pulse when an input pulse is applied thereto simultaneously with a gating pulse with the result that input pulses are switched alternately into the amplifiers 23 and 24 by the AND gates. The amplifiers 23 and 24 drive the coils 13 and 14 respectively to launch pressure waves in the lines 10 and 11 in correspondence respectively with alternate input pulses.

Such pressure waves, after traversing the delay elements 10 and 11 produce output pulses in the coils 15 and 16. The output pulses are amplified in the amplifiers 25 and 26 and applied to the combining means 27. The shaping circuit 28 strobes the signals from 28.

It will be evident that the pulse repetition frequency in each of the delay elements 10 and 11 is half that of the input pulses and that for this reason much more distortion due to dispersion can take place in each delay line before overlap takes place in each delay line. For this reason the lines 10 and 11 may be of considerable length and delays exceeding 900 microseconds with input pulses having lengths of 0.5 microsecond have been obtained.

Figure 2:
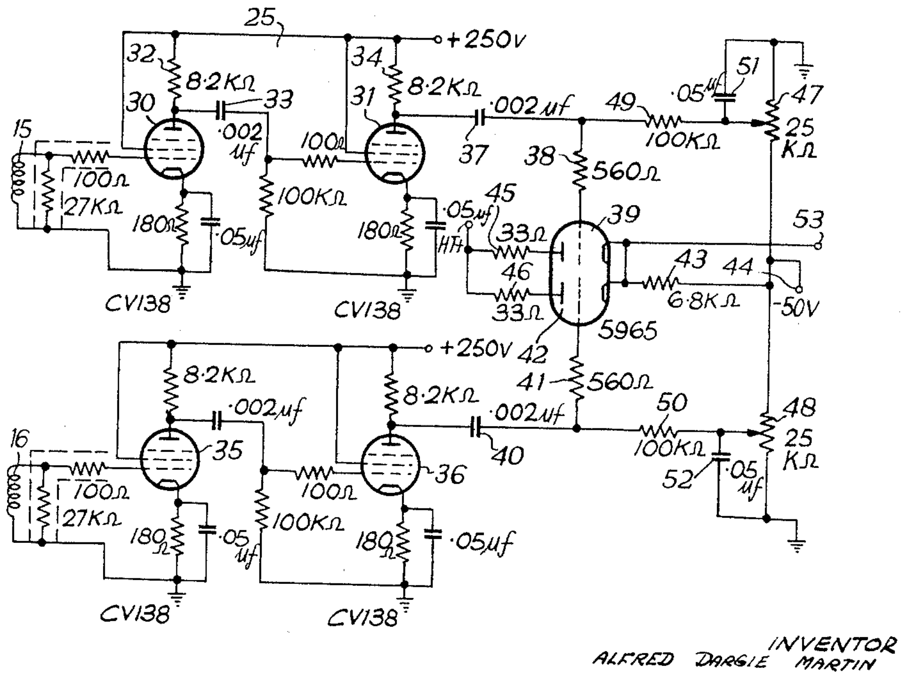
FIG. 2 is a circuit diagram of a combining circuit for use in the delay device of FIG. 1.

Referring now to FIG. 2 this is a circuit diagram of a suitable form of combining circuit for use at 27 in FIG. 1.

In FIG. 2 the amplifier 25 comprising two pentode valves 30 and 31 corresponds to the amplifier 25 of FIG. 1. The output transducer 15 of the delay element 10 is connected between the control grid and cathode of the pentode valve 30 which is provided with an anode load resistor 32. The anode of the valve 30 is coupled to the control grid of the valve 31 through a capacitor 33 and the anode of the valve 31 is provided with an anode load resistor. For completeness other conventional elements such as grid leaks, cathode bias resistors and so on are shown in the drawing and their resistance and capacitance values are also shown.

The amplifier 26 comprising two further pentode valves 35 and 36 corresponds to the amplifier 26 of FIG. 1 and is identical with the amplifier 25.

Signals appearing at the anode of the valve 31 are applied through a capacitor 37 and a resistor 38 in series to the control grid of a triode valve 39. Likewise signals appearing at the anode of the valve 36 are applied through a capacitor 40 and a resistor 41 in series to the control grid of a triode valve 42. The two triodes 39 and 42 may be in the same envelope as shown.

A common cathode load resistor 43 is provided for the two triodes and the end of this resistor remote from the cathodes is connected to a terminal 44 which is maintained by a suitable voltage source (not shown) at a potential of −50 volts relative to earth. Two resistors 45 and 46 are connected between the anodes of the two triodes respectively and the positive terminal HT+ of a source (not shown) of anode current, the negative terminal of this source being earthed.

For the purpose of biasing the control grids of the two triodes negatively two potentiometers 47 and 48 respectively are provided. The resistance element of each potentiometer is connected between the negative terminal 44 and earth and the wiper of the potentiometer 47 is connected through a resistor 49 and the resistor 38 to the control grid of the triode 39. The wiper of the potentiometer 48 is connected through resistor 50 and the resistor 41 to the control grid of the triode 42. Decoupling capacitors 51 and 52 are connected between the wipers of the two potentiometers 47 and 48 respectively and earth.

In operation the bias voltages on the control grids and cathodes of the two triodes 39 and 42 are arranged to be such that regions of signals negative with respect to the mean which corresponds to the cathode level are not reproduced across the common cathode load resistor 43. Positive regions of such signals are reproduced and hence if a negative region of a signal from the amplifier 25 should coincide with a positive region of a signal from the amplifier 26 the former will not be reproduced whereas the latter will be reproduced.

The cathodes of the triodes are connected to an output terminal 53.

Figure 3:
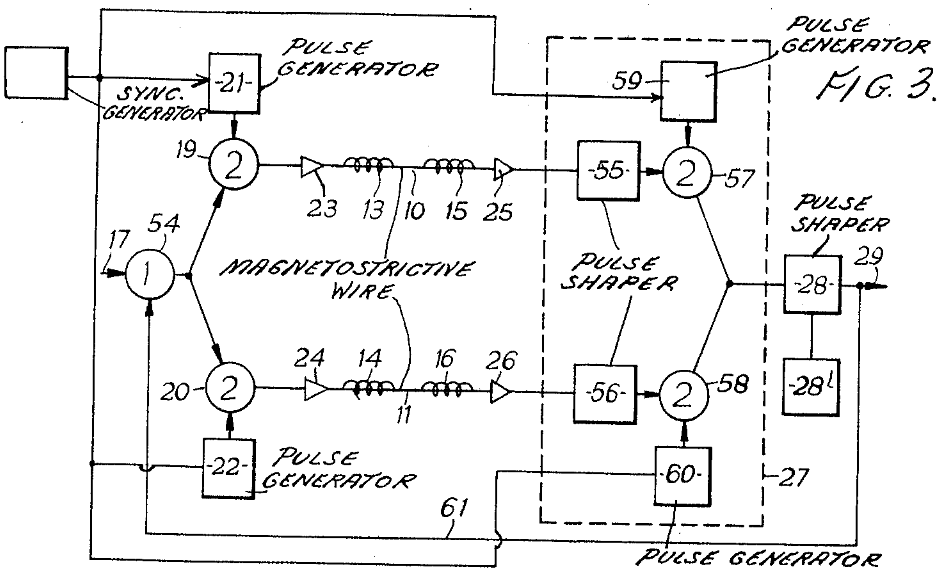
FIG. 3 shows in logical diagram form a further delay device.

The embodiment shown in FIG. 3 will now be described. In FIGS. 1 and 3 like parts are given the same reference.

The input circuit in FIG. 3 is connected through an OR gate 54 to the two AND gates 19 and 20 and the function of the parts 19, 20, 21, 22, 23, 24, 13, 14, 10, 11, 15, 16, 25, 26 and 28 is as described with reference to FIG. 1. A pulse generator 28' is connected to the circuit 28.

In place of the combining circuit 27 of FIG. 1 described in more detail with reference to FIG. 2 there is substituted the combining circuit shown within the broken line 27 of FIG. 3.

This combining circuit comprises two devices 55 and 56 adapted to lengthen and reshape the pulses applied thereto from the amplifiers 25 and 26 respectively.

The outputs of the pulse lengthening and reshaping circuits 55 and 56 are applied to two AND gates 57 and 58 respectively.

Pulses from pulse generators 59 and 60 are applied to the AND gates 57 and 58 respectively and an output voltage appears in the output circuits of the AND gates 57 and 58 whenever there is coincidence between the voltages applied to their two input circuits.

The output voltages appearing in the output circuits of the AND gates 57 and 58 are applied to the pulse lengthening and reshaping circuit 28 and thence to the output lead 29 and through a connection 61 to the OR gate 54, whereby recirculation of the signal can be effected.

Figure 4:
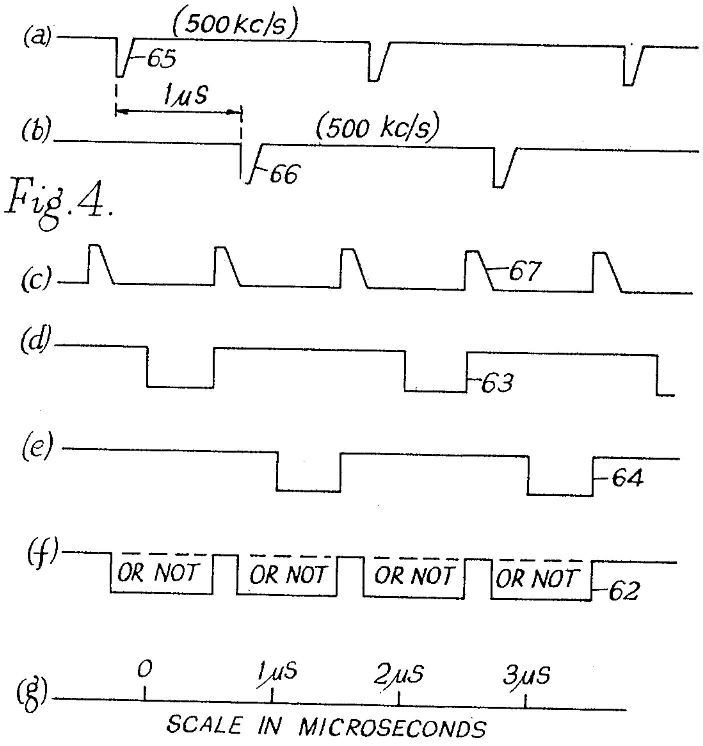
FIG. 4 is an explanatory diagram.

Typical waveforms of the signals applied at 17 are shown in FIG. 4(*f*). The pulses 62 are regularly spaced and may be present or absent as indicated by the term "OR NOT" in the drawing.

FIGS. 4(*d*) and (*e*) respectively show the gating or clock pulses applied from the pulse generators 21 and 22 respectively to the AND gates 19 and 20. The time scale for all the waveforms shown in FIG. 4 is shown in FIG. 4(*g*) and it will be seen that the negative-going clock pulses 63 and 64 coincide with alternate input signals. Thus pulses are applied to the two input transducers alternately.

The distorted pulses appearing in the output transducers are reshaped and lengthened by the devices 55 and 56. Reshaping may conveniently be effected for example by selecting only the tips of the positive-going regions of the signals. Lengthening may be effected in conventional manner by means of a capacitor charged through a rectifier circuit and discharged through a resistor. It can be arranged in this embodiment to lengthen to about 1.6 $\mu$seconds.

Sharply defined leading edges are then obtained by means of the gates 57 and 58, the pulses applied to these gates from the generators 59 and 60 having the waveforms and phases shown at 65 and 66 in FIGS. 4(*a*) and (*b*) respectively.

The pulse lengthening and reshaping circuit 28 may take any convenient form. As with the devices 55 and 56 the pulses may be lengthened by applying them to charge a capacitor and the trailing edges determined by pulses applied to open a rectifier to discharge the capacitor. Such circuits are well known and the pulses applied to the circuit 28 from the generator 28' for the purpose of defining the trailing edges of the pulses may be as shown at 67 in FIG. 4(*c*), whereby the waveform of FIG. 4(*f*) can be reproduced.

It will be appreciated that although embodiments have been described utilising magnetostrictive delay devices, other delay devices such as mercury columns may be used. Switch means and combining means other than those described may alternatively be employed. Furthermore more than two delay elements may be used with appropriate modifications to the switch means and the combining means.

We claim:

1. An electro-mechanical delay device comprising a plurality of electro-mechanical delay elements each having an input transducer, an output transducer, and mechanical delay means intercoupling said transducers to propagate mechanical pressure waves therethrough in response to electrical signals at said input transducer and to provide electrical signals at said output transducer in response to the presence of said pressure waves thereat, switch means adapted to connect the input transducers separately in a recurring sequence to a common input circuit, and a combining circuit means connected between the output transducers and a common output circuit, the combining circuit means being adapted to combine selected portions of each of the respective signals appearing in the output transducers.

2. A delay device according to claim 1, wherein the combining circuit means is adapted to combine the portions of the respective signals applied thereto which exceed a predetermined datum level.

3. A delay device according to claim 2, wherein the combining circuit means includes biased translating devices, one for each output transducer, the bias voltages determining the said datum level.

4. A delay device according to claim 1, wherein the combining circuit means comprises a plurality of AND gates, one for each output transducer, means being provided for applying pulses to the AND gates for determining the portions to be selected from the respective signals applied to the AND gates from the output transducers.

5. A delay device according to claim 1, wherein a connection means is provided for applying signals from the common output circuit to the common input circuit whereby recirculation of signals through the delay device can be affected.

6. A delay device according to claim 5, including in said connection means an OR gate for introducing recirculated signals from said common output circuit to the common input circuit.

7. A delay device according to claim 1, including for each delay element an amplifier connected in series therewith.

8. A delay device according to claim 1, including pulse shaping means in series with each said delay element.

9. An electro-mechanical delay device comprising a plurality of electro-mechanical delay elements, each of said delay elements having an input transducer, an output transducer and a relatively stationary signal transmission structure intercoupling said transducers, the input and output transducers as well as the relatively stationary signal transmission structure of each delay element being separate from those of another delay element, said signal transmission structure including a delay medium for a mechanical propagation of an energy wave therethrough and having signal dispersion characteristics interfering with the resolution at the output transducer of signals at said input transducer having predetermined repetition rapidity, a common input circuit, means for switching sequential signals from said common input circuit to input transducers of different delay elements, and means for combining in a common output circuit the output signals from said output transducers corresponding to the sequential signals applied to the respective input transducers.

10. A delay device according to claim 9, including connected to the output transducer of each delay element means for selecting only a portion of the respective signal thereat for combination in said common output circuit.

11. A delay device according to claim 9, wherein said delay elements are magnetostrictive elements.

12. An electro-mechanical delay device comprising a plurality of delay elements each having an electro-mechanical input transducer, an electro-mechanical output transducer and a signal transmission structure including a delay medium intercoupling said transducers, said delay medium providing a path for mechanical propagation of an energy wave between said transducers, said delay medium having signal dispersion characteristics limiting the resolution of signals at the output transducer to signals resulting from application at said input transducer of input signals having less than a predetermined repetition rapidity, a common input circuit, means for switching sequential signals from said common input circuit to input transducers of different delay elements, and means for combining in a common output circuit the output signals from said output transducers corresponding to the sequential signals applied to the respective input transducers.

13. A delay device comprising a plurality of delay elements, each of said delay elements individually having a signal input means, a signal output means and a signal transmission structure intercoupling said input and output means and including a signal delay medium for mechanical propagation therethrough of an energy wave between said input and said output means, the signal input and output means as well as the signal transmission structure of each delay element being separate from those of another delay element, a common signal input means, means for switching sequential signals from said common input signal means to respective input means of different delay elements, and means for sequentially combining in a common output circuit the output signals from said delay element output means in a sequence corresponding to the sequential signals applied to the respective delay element input means.

14. A delay device according to claim 13, wherein each of said input and output means of said delay elements are electro-mechanical transducers.

15. A delay device according to claim 14, wherein said delay elements are magnetostrictive elements.

16. An electro mechanical delay device comprising a plurality of electro-mechanical delay elements each having an electro-mechanical input transducer, an electro-mechanical output transducer and mechanical delay means intercoupling said transducers for mechanically propagating an energy pulse through said delay means from said input transducer to said output transducer, a common input circuit, switch means operatively connected to sequentially connect the input transducers separately to said input circuit, and a combining circuit means operatively connected between the output transducers and a common output circuit, to combine selected portions of each of the respective signals appearing in the output transducers.

References Cited in the file of this patent

UNITED STATES PATENTS

| | | |
|---|---|---|
| 2,532,817 | Lafferty | Dec. 5, 1950 |
| 2,629,827 | Eckert et al. | Feb. 24, 1953 |
| 2,813,927 | Johnson | Nov. 19, 1957 |
| 2,814,793 | Bonn | Nov. 26, 1957 |